(12) United States Patent
Josset et al.

(10) Patent No.: US 10,848,370 B2
(45) Date of Patent: Nov. 24, 2020

(54) METHOD AND DEVICE FOR OBTAINING DATA PACKETS TRANSMITTED IN A COMMUNICATION NETWORK COMPRISING A PLURALITY OF SUB-NETWORKS

(71) Applicant: ORANGE, Paris (FR)

(72) Inventors: Sebastien Josset, Vanves (FR); Mohamed Ati, Ris Orangis (FR); Laurent Pose, Sevres (FR)

(73) Assignee: Orange, Paris (FR)

(*) Notice: Subject to any disclaimer, the term of this patent is extended or adjusted under 35 U.S.C. 154(b) by 151 days.

(21) Appl. No.: 15/321,721

(22) PCT Filed: Jun. 25, 2015

(86) PCT No.: PCT/FR2015/051721
§ 371 (c)(1),
(2) Date: Dec. 22, 2016

(87) PCT Pub. No.: WO2015/197987
PCT Pub. Date: Dec. 30, 2015

(65) Prior Publication Data
US 2017/0134213 A1    May 11, 2017

(30) Foreign Application Priority Data
Jun. 27, 2014   (FR) .................... 14 56052

(51) Int. Cl.
*G06F 15/173* (2006.01)
*H04L 12/24* (2006.01)
(Continued)

(52) U.S. Cl.
CPC ........ *H04L 41/064* (2013.01); *H04L 41/0677* (2013.01); *H04L 41/12* (2013.01);
(Continued)

(58) Field of Classification Search
CPC ... H04L 41/064; H04L 41/0677; H04L 41/12; H04L 43/062; H04L 43/065; H04L 43/067; H04L 43/0852; H04W 24/08
(Continued)

(56) References Cited

U.S. PATENT DOCUMENTS

| | | | |
|---|---|---|---|
| 2006/0085754 A1* | 4/2006 | Li | G06F 9/451 715/763 |
| 2009/0200867 A1* | 8/2009 | Katz | H02J 3/14 307/40 |

(Continued)

FOREIGN PATENT DOCUMENTS

WO    2012091642 A1    7/2012

OTHER PUBLICATIONS

3rd Generation Partnership Project: Technical Specification Group Services and System Aspects:Telecommunication Management: Subscriber and Equipment Trace; Trace Definition and Management, 3GPP TS 32.423, V9.7.0, WWW.3gpp.org.
(Continued)

*Primary Examiner* — Liang Che A Wang
(74) *Attorney, Agent, or Firm* — Haverstock & Owens LLP

(57) ABSTRACT

The invention concerns a method for obtaining data related to data packets exchanged during at least one communication in a network (R) comprising a plurality of sub-networks (R1, R2, R3, R4, R5). The method is suitable for generating a request comprising a piece of time information and a terminal identifier and for obtaining a response comprising at least one dated dataset related to at least one data packet, said at least one set being selected by a second entity (S2) of at least one second sub-network (R2), from a plurality of datasets related to data packets received by at least one entity of said at least one second sub-network (R2), depending on
(Continued)

Figure 1:
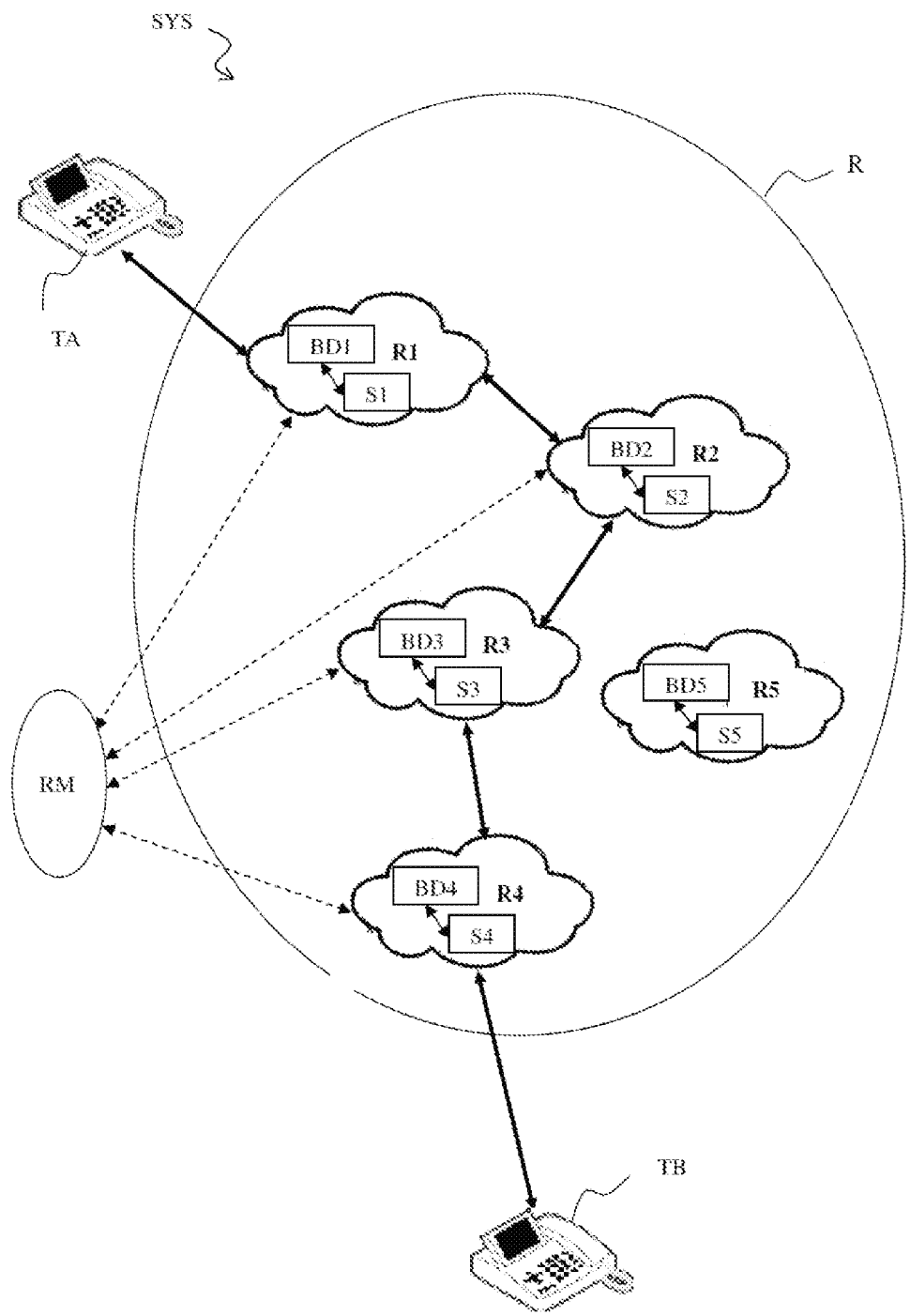

the time information and the terminal identifier. The invention also relates to an entity (S1I) of a sub-network (R1) implementing the obtaining method.

8 Claims, 4 Drawing Sheets

(51) Int. Cl.
  *H04L 12/26* (2006.01)
  *H04W 24/08* (2009.01)
(52) U.S. Cl.
  CPC .......... *H04L 43/062* (2013.01); *H04L 43/065* (2013.01); *H04L 43/067* (2013.01); *H04L 43/0852* (2013.01); *H04W 24/08* (2013.01)
(58) Field of Classification Search
  USPC .......................... 709/217, 218, 223, 224, 229
  See application file for complete search history.

(56) References Cited

U.S. PATENT DOCUMENTS

| | | | |
|---|---|---|---|
| 2009/0247191 A1* | 10/2009 | Sennett | H04W 4/02 455/456.3 |
| 2013/0230171 A1* | 9/2013 | Ivanchykhin | H04L 63/108 380/259 |
| 2013/0294257 A1* | 11/2013 | Gonzalez de Langarica | H04W 24/08 370/242 |
| 2015/0038170 A1* | 2/2015 | Leicht | H04W 24/00 455/456.3 |

OTHER PUBLICATIONS

Attached please find the Written Opinion for the PCT/FR2015/051721 application.

* cited by examiner

| S1 | S2 | S3 | S4 | S5 |
|----|----|----|----|----|
| H1 | T1 | T2 | T3 | V1 |
| H2 | T6 | T5 | T4 | V2 |

METHOD AND DEVICE FOR OBTAINING DATA PACKETS TRANSMITTED IN A COMMUNICATION NETWORK COMPRISING A PLURALITY OF SUB-NETWORKS

The present invention relates to the general field of communications.

It relates more particularly to the processing of data contained in data packets transmitted by communication equipment to other communication equipment via a communication network comprising a plurality of subnetworks.

It concerns more particularly obtaining data packets exchanged between different subnetworks during a communication. Obtaining these packets may be used notably to analyze the behavior of these subnetworks during the communication and in the event of an anomaly in the transmission of the packets, to detect which subnetwork is the cause of this anomaly.

Among these anomalies, may be cited, for example, a loss of pages of a fax or an unexpected interruption in a communication.

In a known way, a communication network may include multiple subnetworks. Such a subnetwork is, for example, a client subnetwork, an access subnetwork, a collection subnetwork, a core subnetwork, an interconnection subnetwork, etc.

These subnetworks are strictly compartmentalized and administered by different teams.

Accordingly, obtaining traces relating to a communication, i.e. of data packets received by the various subnetworks, is a laborious process involving the setting up of a multi-service team.

Each situation is dealt with manually case by case and involves the setting up of crisis management bridges.

One of the aims of the invention is to overcome shortcomings/drawbacks of the prior art and/or to make improvements thereto.

To this end, the invention provides a method for obtaining data relating to data packets exchanged in the course of at least one communication in a network comprising a plurality of subnetworks.

The obtaining method comprises the following steps, implemented by a first entity of a first subnetwork of said network:
  obtaining at least one piece of time information defining at least one time interval and at least one terminal identifier for said at least one communication;
  generating a request comprising said at least one piece of time information and said at least one terminal identifier;
  obtaining at least one response to said request, comprising at least one dated dataset relating to at least one data packet, said at least one set being selected by a second entity of at least one second subnetwork of said network from a plurality of datasets relating to data packets received by at least one entity of said at least one second subnetwork, according to said at least one piece of time information and said at least one terminal identifier.

The processing method relates to a communication established between a first terminal and a second terminal in a network comprising a plurality of subnetworks, in the course of which data packets are exchanged. The data packets thus travel via multiple subnetworks of the network.

A request generated by an entity of a first subnetwork may be used to obtain one or more responses containing data relating to data packets received by one or more other subnetworks of the network.

It is thus possible for an entity of a first subnetwork to obtain data packets received by other subnetworks.

Each response is prepared by an entity of another subnetwork.

The request comprises at least two parameters which are at least one piece of time information defining at least one time interval and at least one terminal identifier. These parameters allow an entity of a second subnetwork to select data packets transmitted or received by a terminal during one or more time intervals chosen in the first entity.

The responses obtained allow an operator of the first subnetwork to know whether a data packet received in the first subnetwork has also been received by other subnetworks. They may notably be used to identify problems in transmitting packets between subnetworks, typically data packets that do not reach the destination terminal. They may also be used to determine the subnetwork causing a problem in transmitting packets.

According to a particular embodiment of the obtaining method, the generated request is transmitted to said at least one second entity of said at least one second subnetwork via a second communication network.

The transmission of the command via a second communication network is a simple means for the first entity to communicate with a second entity.

The use of a second communication network allows the first entity to reach a second entity directly without passing through the other subnetworks. Thus, it is possible for the first entity to communicate with an entity of a second subnetwork even in the case of the problem occurring in the communication network.

According to a particular embodiment, the obtaining method comprises a step of obtaining at least one second dated dataset extracted from at least one data packet, said at least one packet being selected by said first entity of the first subnetwork from a plurality of data packets received by at least one entity of said first network, according to said at least one piece of time information and said at least one terminal identifier and a step of classifying the sets obtained according to a date associated with each set.

Classifying the sets received by a first entity and at least one second entity allows highlighting possible interruptions in the transfer of the packets between subnetworks.

According to a particular feature of the obtaining method, at least one date of at least one set is modified according to a piece of predetermined offset information.

Modifying a date of a set according to a piece of offset information allows taking into account a clock difference between two entities.

The clock difference may originate from a loss of synchronization between the clocks of two entities. It may also occur when the entities are not located in the same time zones and/or when the local time is different between the two entities.

According to a particular embodiment of the obtaining method, determining said piece of offset information includes a transmission to an entity of a said subnetwork, of a given signal and a reception of said signal from said second entity.

Sending a given signal by a first to a second entity followed by the reception of this signal from this second entity is a simple means of obtaining a piece of information on the clock offset between the first entity and the second entity.

The use of a known signal allows an operator of the first entity to identify the datasets relating to the packets generated for transmitting this signal.

According to a particular feature of the obtaining method, during the transmission and reception of said signal, said given signal passes through at least one intermediate subnetwork.

Said signal traveling via an intermediate subnetwork causes the reception of data packets relating to the signal by an entity of the intermediate subnetwork.

The obtaining by the first entity of datasets relating to the data packets received by the intermediate subnetwork for this signal allows determining a piece of information on the clock offset between the first entity and an intermediate subnetwork entity capable of obtaining said datasets.

The invention also relates to a method for processing data relating to data packets exchanged in the course of at least one communication in a network comprising a plurality of subnetworks.

The processing method comprises the following steps, implemented by an entity of a second subnetwork of said network:
   obtaining a request comprising at least one piece of time information defining at least one time interval and at least one terminal identifier for said at least one communication;
   selecting from a plurality of datasets relating to data packets received by at least one entity of said second subnetwork, at least one dated dataset, according to said at least one piece of time information and said at least one terminal identifier;
   determining a response to the request comprising said at least one selected dataset.

The invention also relates to an entity of a first subnetwork of a communication network comprising:
   a module for obtaining at least one piece of time information defining at least one time interval and at least one terminal identifier for said at least one communication;
   a module for generating a request comprising said at least one piece of time information and said at least one terminal identifier;
   a module for obtaining at least one response to said request, comprising at least one dated dataset relating to at least one data packet, said at least one set being selected by a second entity of at least one second subnetwork of said network from a plurality of datasets relating to data packets received by at least one entity of said at least one second subnetwork, according to said at least one piece of time information and said at least one terminal identifier.

The invention also relates to an entity of a second subnetwork of a communication network comprising:
   a module for obtaining a request comprising at least one piece of time information defining at least one time interval and at least one terminal identifier for said at least one communication;
   a module for selecting from a plurality of datasets relating to data packets received by at least one entity of said second subnetwork, at least one dated dataset, according to said at least one piece of time information and said at least one terminal identifier;
   a module for determining a response to the request comprising said at least one selected dataset.

According to a preferred implementation, the various steps of the method according to the invention are implemented by a computer program or software.

Thus the invention concerns a program or software, capable of being executed by a computer or by a data processor, this software/program comprising instructions for controlling the execution of the steps of a processing method. These instructions are intended to be stored in a memory of a computing device, loaded then executed by a processor of this computing device.

This software/program may use any programming language, and be in the form of source code, object code, or intermediate code between source code and object code, such as in a partially compiled form, or in any other desirable form.

The computing device may be implemented by one or more physically separate machines and have the overall architecture of a computer, including components of such an architecture: data memory/memories, processor(s), communication bus, hardware interface(s) for connecting this computing device to a network or other equipment, user interface(s), etc.

The invention also relates to an information medium, capable of being read by a data processor, and comprising instructions for a program such as that mentioned above. The information medium may be any entity or device capable of storing the program.

Figure 2:
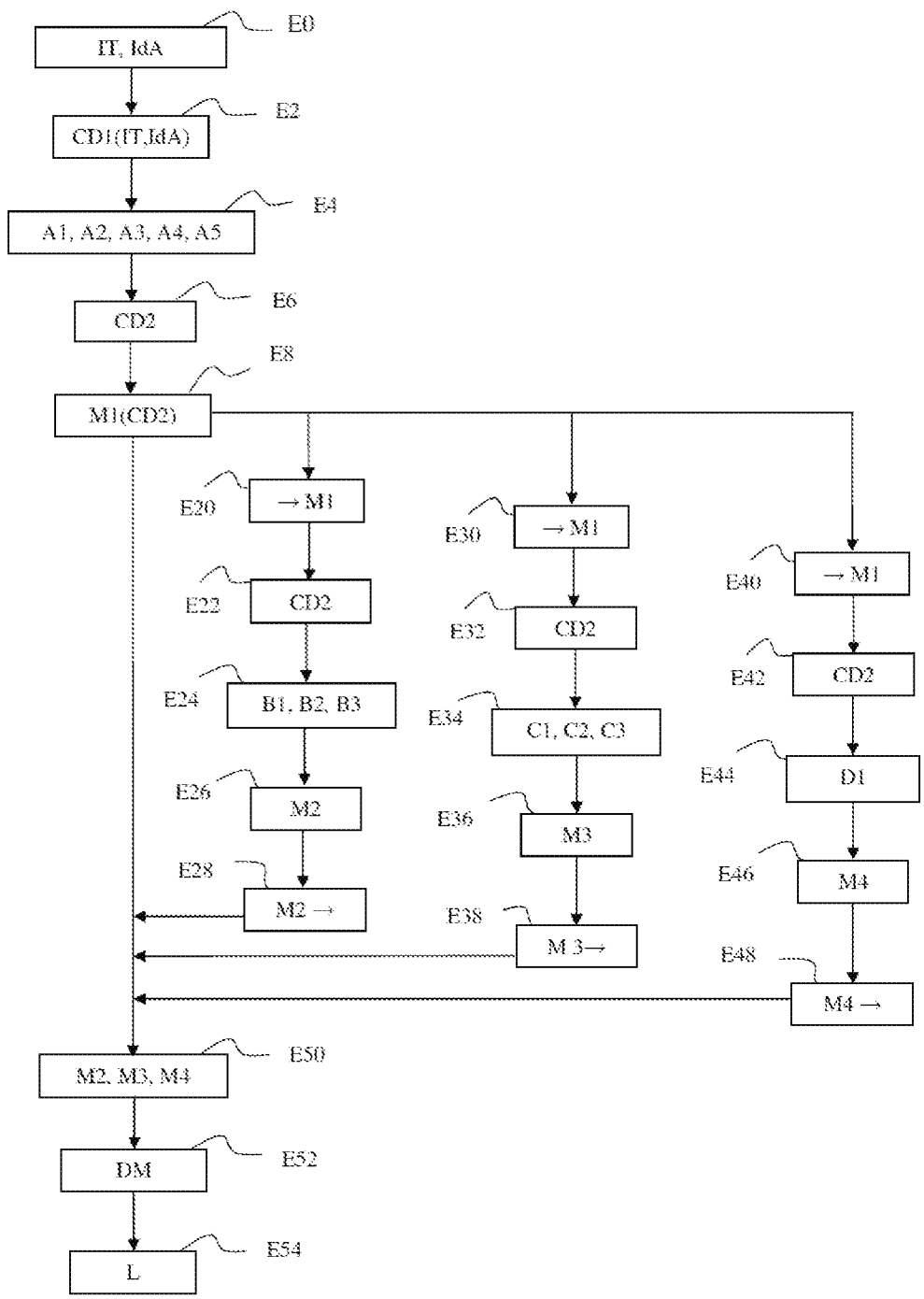
Figures 3, 4:
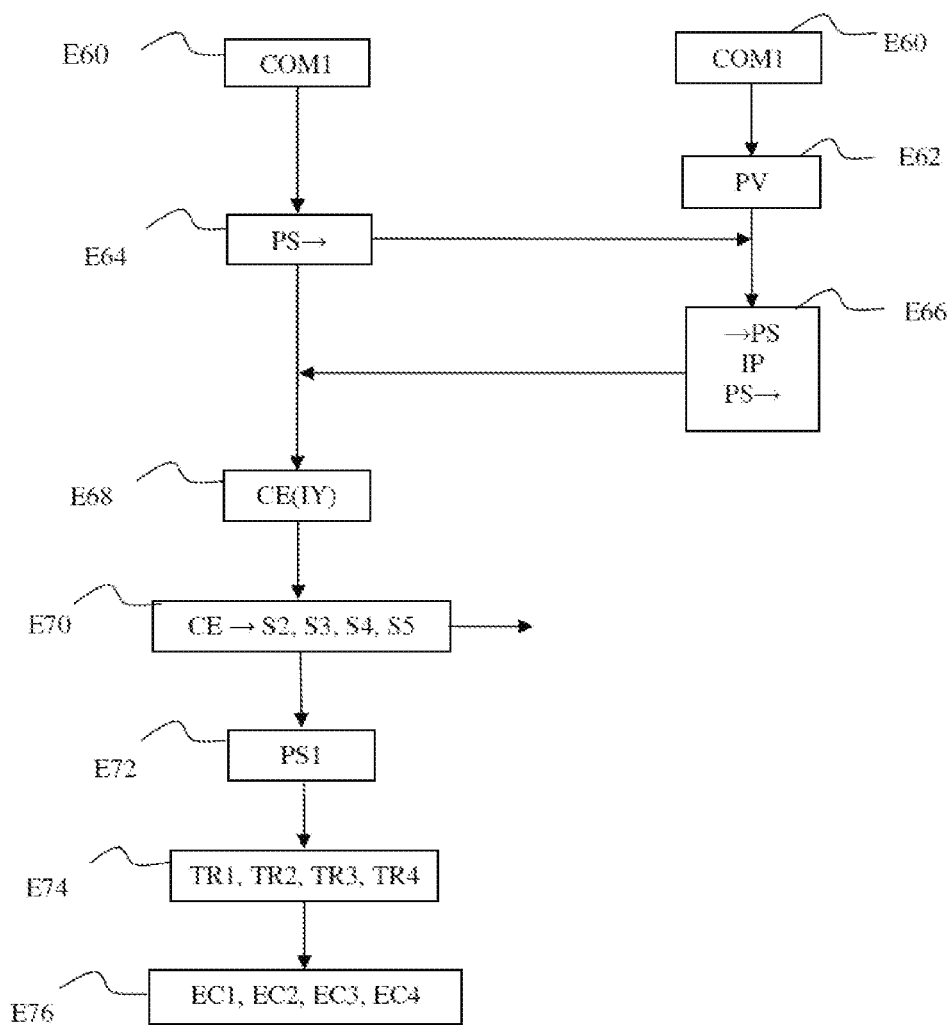
Figure 5:
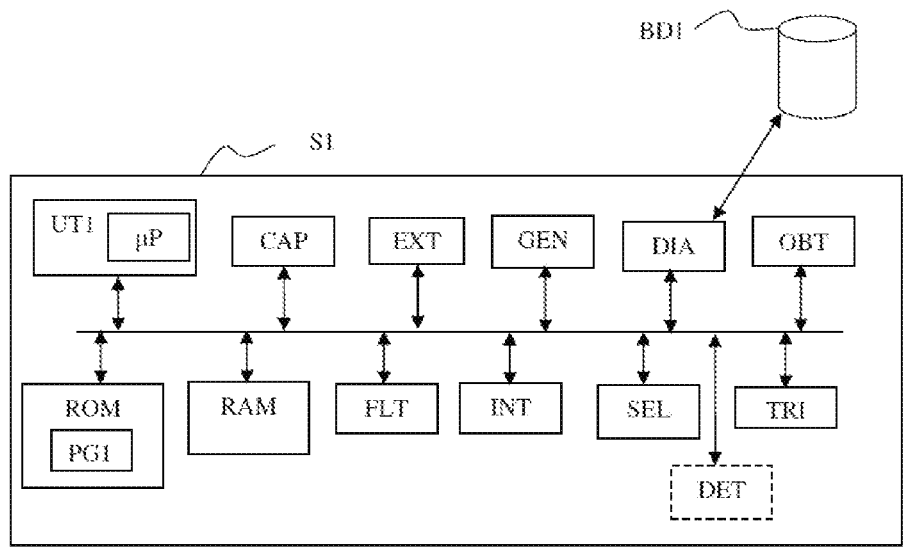
Figure 6:
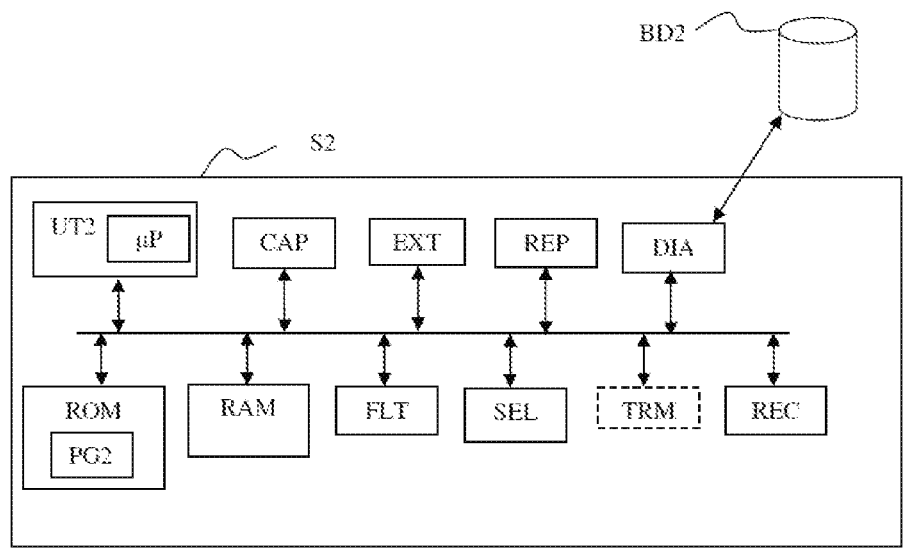

Other features and advantages of the present invention will appear in the following description of an embodiment Oven as a non-restrictive example, with reference to the accompanying drawings, in which:

FIG. 1 is a diagram illustrating a system according to an embodiment of the invention, FIG. 2 is a flow diagram illustrating the various steps of an obtaining method and a processing method according to an embodiment of the invention, FIG. 3 is a flow diagram illustrating a step of determining difference values, according to an embodiment of the invention, FIG. 4 illustrates an example of a table comprising reception times according to an embodiment of the invention, FIG. 5 is a diagram illustrating a first processing device according to an embodiment of the invention, FIG. 6 is a diagram illustrating a second processing device according to an embodiment of the invention.

The invention is implemented by means of software and/or hardware components. In this context, the term "module" may correspond in this document both to a software component and to a hardware component or to a set of hardware and/or software components, capable of implementing a function or a set of functions, according to what is described below for the module concerned.

A software component is one or more computer programs, one or more subprograms of a program, or more generally any program or software element. Such a software component is stored in memory then loaded and executed by a data processor of a physical entity (terminal, server, gateway, set-top-box, router, etc.) and is capable of accessing the hardware resources of this physical entity (memories, recording media, communication bus, input/output electronic boards, user interfaces, etc.).

Similarly, a hardware component is any element of a hardware assembly. It may be a programmable hardware component or with an integrated processor for the execution of software, e.g. an integrated circuit, a smart card, an electronic card for the execution of a piece of firmware, etc.

An embodiment of a method of obtaining data and a method of data processing will now be described with reference to FIGS. 1 and 2.

FIG. 1 represents a system SYS including a communication network R.

The system SYS also includes a first terminal TA and a second terminal TB capable of communicating via the communication network R.

The network R includes a plurality of subnetworks, e.g. the subnetworks R1, R2, R3, R4 and R5.

The subnetwork R1 is, for example, a VoIP ("Voice over IP") network. The subnetwork R2 is, for example, an access and collection network. The subnetwork R3 is, for example, a core network. The subnetwork R4 is, for example, a network of a third party operator. The subnetwork R5 is, for example, a PSTN ("Public Switched Telephone Network") network.

Processing devices S1, S2, S3, S4 and S5 are installed respectively in each subnetwork R1, R2, R3, R4 and R5.

The processing devices S1, S2, S3, S4 and S5 are respectively items of equipment of the subnetworks R1, R2, R3, R4 and R5 of the network R. Each processing device is, for example, a PC type computer.

As an alternative, some subnetworks of the network R do not have a processing device.

The terminals TA and TB are capable of communicating with one or more other terminals via the communication network R.

A terminal is an item of communication equipment. A terminal is, for example, a telephone terminal, e.g. a telephone, a fax, a server, a telephone connected to a PABX ("Private Automatic Branch eXchange"), etc.

Each processing device S1, S2, S3, S4 and S5 is capable of capturing, i.e. intercepting without modifying the routing thereof, the data packets transmitted and/or received by the subnetwork in which the processing device considered is installed.

The captured data packets include signaling data packets and/or content packets.

These data packets are optionally filtered according to first predefined selection criteria. This filtering may be used to select data packets from the captured data packets.

For example, the data packets relating to one or more given protocols are selected and the packets relating to other protocols are ignored. For example, VoIP packets are selected and file transfer data packets transmitted according to the FTP ("File Transfer Protocol") protocol and data packets transmitted according to the HTTP ("Hypertext Transfer Protocol") web protocol are ignored.

As an alternative, no filtering is performed.

Then, a dataset is obtained for each selected data packet.

The dataset obtained for a data packet considered includes all or part of the data contained in the data packet considered.

The datasets are, for example, determined according to second predetermined criteria.

For example, each dataset includes data contained in the "from" and "to" fields of the data packet considered.

Each dataset is recorded in a storage area, e.g. a database BD accessible by the processing device in association with a date, e.g. a capture date of the data packet by the processing device or an arrival date of the data packet at the subnetwork. The arrival date is, for example, expressed in the form "day-month-year-hour-minute-second."

The storage area BD is, for example, a FIFO ("First Input First Output") type. The storage area BD thus contains a plurality of packets corresponding to the packets transmitted and/or received during a time interval, e.g. equal to a month or a week.

The processing device S1 thus has a storage area BD1 recording dated datasets determined from packets transmitted or received by the subnetwork R1.

Likewise, each processing device S2, S3, S4, S5 respectively has a storage area BD2, BD3, BD4, BD5 respectively recording dated datasets determined from data packets transmitted or received by the associated subnetwork.

An embodiment of an obtaining method and a processing method will now be described with reference to FIG. 2.

In this embodiment, the obtaining method is implemented by the processing device S1 of the subnetwork R1 and a processing method is implemented respectively by the processing devices R2, R3 and R4 of the respective subnetworks R2, R3 and R4 of the network R.

Within the meaning of the invention, the processing device S1 represents a first subnetwork entity and the processing devices S2, S3, and S4 respectively represent second subnetwork entities.

In a first preliminary step E0, an operator of the subnetwork R1, enters a piece of time information IT and an identifier IdA of the terminal TA, via a graphical interface displayed on a display screen of the processing device S1 and by means of a user interface, e.g. a computer mouse and a keyboard of the processing device S1.

The processing device S1 thus obtains at least one piece of time information and at least one terminal identifier relating to at least one communication.

The time information IT defines a time interval IV.

The time information IT is, for example, a date expressed in the form "month-day-year" e.g. Apr. 12, 2014 and the time interval IV is, for example, an interval beginning on Apr. 12, 2014 at 0 h00 mn and ending at 0 h59 mn 59 s.

As an alternative, the time interval IV is defined by a start date and an end date.

The terminal identifier TA is, for example, an IP ("Internet Protocol") address of the terminal TA.

The step E0 is, for example, performed following a complaint by a user of the terminal TA indicating a failure during an attempt to send a fax.

In a step E2, the processing device S1 constructs a first request CD1 containing the time information IT and the terminal identifier TA.

In a step E4, the processing device S1 accesses the storage area BD1 of the processing device S1 and selects from the datasets recorded in the storage area BD1, one or more dated datasets according to the search parameters contained in the first request CD1, i.e. according to the time information IT and the terminal identifier IdA.

The selected dated datasets are thus obtained by the processing device S1.

Each selected dataset contains all or part of the data relating to a data packet stored in the storage area BD1.

As an alternative, a dataset also includes data calculated from data extracted from the data packet.

Such a calculated value is, for example, the number of characters in a field of the data packet, e.g. the number of characters in the field entitled "call-Id".

A calculated item of data is calculated by the processing device S1 before recording the data in the storage area or after selecting the data in the storage area.

For example, five datasets A1, A2, A3, A4 and A5 are obtained.

The datasets A1, A2 and A3 are, for example, related to a first communication between the terminal TA and the terminal TB. The datasets A4 and A5 are, for example, related to a second communication between the terminal TA and a terminal TC (not represented).

In a step E6, the processing device S1 constructs a second request CD2.

The second request CD2 contains the time information IT and the identifier IdA of terminal TA.

It also includes one or more additional parameters with respect to the first request CD1, e.g. an identifier IdB of the terminal TB.

The additional parameter or parameters are, for example, entered by the operator by means of a user interface after display of the datasets obtained in step E4 on a display screen of the processing device S1.

As an alternative, the second request CD2 does not include an additional parameter and the second request CD2 is the first request CD1.

In a step E8, a message M1 containing the second request CD2 is transmitted to each of the processing devices S2, S3, and S4.

The processing devices to which the message M1 is sent are, for example, chosen from the plurality of devices S2, S3, S4 and S5 of the system SYS by an operator of the processing device S1.

The processing devices to which the message M1 is sent are, for example, chosen by means of a user interface.

As an alternative, the message M1 is sent to all the processing devices of the network R.

The message M1 is, for example, transmitted via a communication network other than the communication network R, e.g. a second communication network RM.

The message M1 is, for example, transmitted via a messaging service, e.g. in the form of an SMS ("Short Message Service"), an instant messaging message ("Instant Message"), an e-mail message, etc.

The second request CD2 is transmitted securely. It is notably signed with a secret key of the processing device S1.

It is optionally encrypted, compressed and/or encoded. Encoding can notably be used to eliminate some characters that are not suited to the messaging service used. Compressing the request CD2 can be used to reduce the size of the message M1.

The second query CD2 is, for example, transmitted in the form of a string of characters in ISO/646 ("International Organization for Standardization") format or in ASCII ("American Standard Code for Information Interchange") format.

The message M1 is received by the processing device S2 in a step E20.

In the embodiment described, the message M1 is received by a receiving module of the processing device S2.

As an alternative, the message M1 is transmitted to the receiving module of the processing device S2 following an action of the operator of the processing device S2, e.g. a copy/paste text received in an e-mail.

In a step E22, the second processing device S2 verifies that the received message M1 has been signed by an authorized person. It decompresses the message M1 and decrypts it.

Thus it obtains the second request CD2.

The keys used for both signing or verifying a signature and for encrypting or decrypting are keys of key systems shared between the first device S1 and the second device S2.

The process of signing and the process of encryption/decryption used are systems known in the state of the art and accordingly are not described here.

In the event that the request CD2 of the message M1 has been signed by an unauthorized person, the process stops.

In a step E24, the processing device S2 accesses the storage area BD2 of the processing device S2 and selects from the datasets recorded in the storage area BD2, one or more dated datasets according to the search parameters contained in the second request CD2, i.e. notably according to the time information IT and the terminal identifier IdA.

Each selected dataset contains all or part of the data relating to a data packet stored in the storage area BD2.

As an alternative, a dataset also includes data calculated by the second processing device S2 from data extracted from the data packet.

Step E24 is similar to step E4 previously described.

For example, three datasets B1, B2 and B3 are selected.

In a step E26, the second processing device S2 constructs a message M2 containing the datasets B1, B2 and B3.

The message M2 is a message encrypted by an encryption key for preserving the confidentiality of the data. It is also signed. It may also be encoded and compressed.

The message M2 represents a response to the request CD2.

In a step E28, the processing device S2 transmits the message M2 to the processing device S1.

The message M2 is, for example, transmitted via a communication network other than the communication network R. It is, for example, transmitted via the second communication network RM or via another communication network.

The message M2 is, for example, transmitted via a messaging service.

The messaging service used for transmitting the message M2 is the same messaging service as the one used by the processing device S1 for transmitting the message M1.

As an alternative, a messaging service different from the one used for transmitting the message M1 is used for transmitting the message M2.

In steps E30 to 38, similar to steps E20 to E28, the processing device S3 receives the message M1 containing the second request CD2, determines a response to the request CD2, by accessing the storage area BD3, and transmits a message M3 containing the determined response, to the processing device S1. The message M3 contains, for example, datasets C1, C2 and C3.

In steps E40 to 48, similar to steps E20 to E28, the processing device S4 receives the message M1 containing the second request CD2, determines a response to the request CD2, by accessing the storage area BD4, and transmits a message M4 containing the determined response, to the processing device S1. The message M4 contains, for example, a dataset D1.

The messages M2, M3 and M4 are received by the processing device S1 in a step E50.

The processing device S1 thus obtains datasets B1, B2, B3 from the processing device S2, datasets C1, C2, C3 from the processing device S3 and a dataset D1 from the processing device S4.

In a step E52, the processing device S1 determines a modified date DM for each dataset obtained, in the time reference frame of the subnetwork R1.

Indeed, even if the clocks of subnetworks are synchronized between them, e.g. by a standardized protocol NTP ("Network Time Protocol"), a clock offset is often observed. In addition, different processing devices may be located in different time zones.

The NTP protocol is, for example, described in RFC ("Request for Comments") 1305 of the IETF ("Internet Engineering Task Force").

The modified date of a dataset obtained by the second processing device S2 is obtained by adding a difference value EC2 to the date initially associated with this dataset received from the processing device S2. The difference value EC2 is a predetermined value.

The modified date of a dataset obtained by the third processing device S3 is obtained by adding a difference value EC3 to the date initially associated with this dataset. The difference value EC3 is a predetermined value.

The modified date of a dataset obtained by the fourth processing device S4 is obtained by adding a difference value EC4 to the date initially associated with this dataset. The difference value EC4 is a predetermined value.

The difference values EC2, EC3, EC4 respectively represent offset information within the meaning of the invention.

An embodiment of determining difference values is given, as an example, in the remaining description, with reference to FIG. 3.

Step E52 is followed by a step E54 in which the processing device S1 orders the datasets according to the modified dates.

Following step E54, an ordered list L of the datasets is obtained.

For example, the ordered list L is A1, B1, C1, D1, A2, B2, C2, A3, B3, C3.

The list L is, for example, displayed on a display screen of the processing device S1. An operator may analyze the displayed list and observe that the processing device S4 is probably the cause of the problem.

In the embodiment described, the messages transmitted between the different devices use the same messaging service. As a variant, different messaging services may be used. For example, the processing devices S1 and S2 communicate via an instant messaging service and the processing devices S1 and S3 communicate via an SMS messaging service.

Steps E0, E2, E4, E6, E8, E50, E52 and E54 represent the steps in the obtaining method implemented, for example, by the processing device S1.

Steps E20, E22, E24, E26 and E28 represent the steps in the processing method implemented, for example, by the processing device S2.

Steps E30, E32, E34, E36 and E38 represent the steps in the processing method implemented, for example, by the processing device S3.

Steps E40, E42, E44, E46 and E48 represent the steps in the processing method implemented, for example, by the processing device S4.

An embodiment of determining difference values in the network R will now be described with reference to FIG. 3.

In a step E60, the processing device S1 initiates and establishes a communication COM1 with another processing device of the network R, e.g. the processing device S4. The establishment of a communication is a known process and will not be detailed here.

In establishing this communication, the processing device S1 forces the exchanged data packets to traverse all the subnetworks of the network R.

Thus, for example, it forces one or more data packets transmitted by the processing device S1 to pass through the subnetwork R2, then through the subnetwork R3, then through the subnetwork R5 before reaching the subnetwork R4.

Following the establishment of the communication COM1, in a step E62, the processing device S1 sends one or more data packets PS containing a predefined signal in the direction of the processing device S4.

The predefined signal is, for example, a "ramp" signal.

The packets transmitted by the processing device S1 are received by the various subnetworks then by the processing device S4.

Datasets relating to the data packets received by the processing devices are respectively recorded in the storage areas associated with these processing devices.

Also, following the establishment of the communication COM1, in a step E64, the processing device S4 sends empty data packets PV i.e. packets not containing any signal.

The processing device S4 sends data packets PV until it receives the packets PS transmitted by the processing device S1.

In a step E66, the processing device S4 having received the first data packet PS waits for a predefined time interval IP, e.g. 200 ms ("milliseconds"), counted from the start of receiving the first packet PS. Then the processing device S4 sends back the received packets PS, to the processing device S1 via the same path.

In a step E68, the processing device S1 having received the data packets transmitted by the processing device S4, i.e. the packets PV then the packets PS generates a request CE containing as a parameter a piece of time information TE defining a time interval IY containing the transmission date of the packets and an identifier of the processing device S1. The time interval IY includes the date of transmission of the packets PS by the processing device S1 and the reception date of these packets.

The processing device S1 transmits the request CE to the storage area BD1 and receives in return a dataset for each packet PS transmitted.

In a step E70, the processing device S1 transmits the request CE to each other processing device of the network R.

It receives in return from the various processing devices dated datasets relating to the data packets PV and PS.

In a step E72, the processing device S1 identifies from all the datasets received the datasets corresponding to the packets PS.

Indeed, since the signal transmitted in the data packets PS is predetermined, it is easy to identify the datasets relating to these packets.

It is assumed that the first packet PS transmitted, e.g. a packet PS1, is transmitted at the date H1 and received by the processing device S1 at the date H2. The dates H1 and H2 are dates of the time reference frame of the device S1.

The first packet PS1 is received by the processing device S2 at the date T1, then at the date T6. The dates T1 and T6 are dates of the time reference frame of the device S2.

The first packet PS1 is received by the processing device S3 at the date T2, then at the date T5. The dates T2 and T5 are dates of the time reference frame of the device S3.

The first packet PS1 is received by the processing device S5 at the date T3, then at the date T4. The dates T1 and T4 are dates of the time reference frame of the device S4.

The first packet PS1 is received at the date V1 and retransmitted by the processing device S4 at the date V2. The dates V1 and V2 are dates of the time reference frame of the device S4.

The transfer time of a packet between the processing device S1 and the processing device S2 is a value TR1.

The transfer time of a packet between the processing device S2 and the processing device S3 is a value TR2.

The transfer time of a packet between the processing device S3 and the processing device S5 is a value TR3.

The transfer time of a packet between the processing device S5 and the processing device S4 is a value TR4.

FIG. 4 is a table illustrating an example of time of reception of the first packet PS1 by the various processing devices according to one example.

Step E72 is followed by a step E74 in which the processing device S1 determines the transfer time values TR1, TR2, TR3 and TR4.

The time difference between the dates T4 and T3 is defined by the equation $$F1: T4-T3=2*TR4+IP.$$

The time difference between the dates T5 and T2 is defined by the equation $$F2: T5-T2=2*TR3+2*TR4+IP.$$

The time difference between the dates T6 and T1 is defined by the equation $$F3: T5-T2=2*TR2+2*TR3+2*TR4+IP.$$

The time difference between the dates H2 and H1 is defined by the equation $$F4: H2-H1=2*TR2+2*TR3+2*TR4+IP.$$

The solution to the equations F1, F2, F3 and F4 is used to obtain the transfer time values TR1, TR2, TR3 and TR4.

Then, in a step E76, the processing device S1 calculates the difference values EC1, EC2, EC3 and EC4.

The difference EC1 is defined by the formula F5: EC1=(H1+TR1)−T1

The difference EC2 is defined by the formula F5: EC2=(H1+TR1+TR2)−T2

The difference EC3 is defined by the formula F5: EC3=(H1+TR1+TR2+TR4)−T3

The difference EC4 is defined by the formula F5: EC4=(H1+TR1+TR2±TR4+IP)−V1.

According to a chosen embodiment represented in FIG. 5, a processing device implementing an obtaining method according to the invention is, for example, a computer S1 which comprises, in a known way, notably a processing unit UT1 provided with a microprocessor, a read-only ROM or EEPROM memory, and a random access RAM memory.

The processing device S1 comprises, in a known way, notably a processing unit UT1 provided with a microprocessor, a read-only ROM or EEPROM memory, and a random access RAM memory. The processing device S1 may conventionally and non-exhaustively comprise the following elements: a microphone, a speaker, a disk drive, a keyboard, a display screen, a display module for the display on the display screen, a storage medium, etc.

The read-only memory comprises registers storing a computer program PG1 comprising program instructions suitable for implementing an obtaining method according to an embodiment of the invention previously described.

The processing device S1 is, for example, an entity of a first subnetwork of a communication network R, e.g. a subnetwork R1.

The processing device S1 also comprises a capture module CAP, a filtering module FLT, an extraction module EXT, an interface module INT, a request generating module GEN, a dialog module DIA for dialoging with a storage area BD1, a selection module SEL, an obtaining module OBT and a classifying module TRI.

The capture module CAP is capable of capturing, i.e. intercepting data packets contained in the streams transmitted and/or received by the subnetwork R1. Interception is here performed without disrupting communications. In other words, any stream transmitted by a first item of communication equipment to a second item of equipment arriving at the subnetwork R1 is intercepted by the capture module CAP and received by the second item of equipment in the same way as if it were not intercepted.

Interception is transparent to the users of the equipment.

A stream transmitted by an item of equipment contains a succession of data packets.

The capture module CAP accordingly obtains a plurality of data packets from a plurality of items of equipment, directly, via another subnetwork of the network R or via another communication network. Another network is, for example, a local area network.

The data packets obtained include data packets of different types, e.g. SIP ("Session Initiation Protocol") data packets, and PSTN ("Public Switched Telephone Network") data packets.

The filtering module FLT is capable of filtering the packets obtained by the capture module CAP according to predetermined selection criteria.

For example, the filtering module FLT is configured for obtaining SIP data packets from the data packets obtained by the capture module CAP and for rejecting H323 packets.

This filtering operation consists in extracting all the packets or some data packets obtained by the capture module CAP, transmitting the extracted packets to the extraction module EXT and/or recording them in a memory of the processing device S1.

The data extraction module EXT is capable of obtaining datasets containing data extracted from the data packets obtained following the filtering operation, according to second predefined selection criteria.

For example, in the event that the extracted data packets correspond to SIP signaling messages, the data corresponding to the "sequence type", "from", "to", and "call-id" fields are extracted and recorded in a memory of the processing device in association with an arrival date of the data packet.

The datasets obtained are, for example, recorded in the storage area BD1.

The interface module INT is capable of obtaining at least one piece of time information defining at least one time interval and at least one terminal identifier for at least one communication.

The generating module GEN is capable of generating a request comprising said at least one piece of time information and said at least one terminal identifier.

The obtaining module OBT is capable of obtaining at least one response to the request, the response obtained comprises at least one dated dataset relating to at least one data packet, said at least one set being selected by a second entity of at least one second subnetwork of the network R, from a plurality of datasets relating to data packets received by at least one entity of said at least one second subnetwork of the network R, according to said at least one piece of time information and said at least one terminal identifier.

The dialog module DIA is suitable for accessing the storage area BD1.

The selection module SEL is capable of selecting from a plurality of datasets relating to data packets received by at least one entity of the subnetwork R1, at least one dated dataset according to said at least one piece of time information and said at least one terminal identifier.

The classifying module TRI is capable of classifying datasets obtained by the processing device S1, according to a date associated with each set.

The processing device S1 may also comprise a determining module DET capable of determining a piece of information on clock offset with at least one other entity of at least one other subnetwork of network R.

More generally, a storage means, capable of being read by a computer or by a microprocessor, whether or not integrated in the device, optionally removable, stores a program implementing the steps of an obtaining method, according to the invention.

According to a chosen embodiment represented in FIG. 6, a processing device implementing a processing method according to the invention is, for example, a computer S2 which comprises, in a known way, notably a processing unit UT2 provided with a microprocessor, a read-only ROM or EEPROM memory, and a random access RAM memory.

The processing device S2 may conventionally and non-exhaustively comprise the following elements: a microphone, a speaker, a disk drive, a keyboard, a display screen, a display module for the display on the display screen, a storage medium, etc.

The read-only memory comprises registers storing a computer program PG2 comprising program instructions suitable for implementing a processing method according to an embodiment of the invention previously described.

The processing device S1 is, for example, an entity of a second subnetwork of a communication network R, e.g. a subnetwork R2.

The processing device S2 also comprises a capture module CAP, a filtering module FLT, an extraction module EXT, a request receiving module REC, a dialog module DIA for dialoging with a database BD2, a response determining module REP, and a selection module SEL.

The capture module CAP, the filtering module FLT and the extraction module EXT are similar to those previously described with reference to FIG. 5.

The request receiving module REC is capable of obtaining a request comprising at least one piece of time information defining at least one time interval and at least one terminal identifier for at least one communication.

The selection module SEL is capable of selecting from a plurality of datasets relating to data packets received by at least one entity of the second subnetwork R2, at least one dated dataset, according to said at least one piece of time information and said at least one terminal identifier.

The response determining module REP is capable of determining a response to the request obtained, the response comprising said at least one selected dataset.

The processing device S2 may also comprise a module TRM for transmitting the determined response via a communication network other than the network R, e.g. via a messaging service.

More generally, a storage means, capable of being read by a computer or by a microprocessor, whether or not integrated in the device, optionally removable, stores a program implementing the steps of a control method, according to the invention.

The invention claimed is:

1. A method for obtaining data relating to data packets exchanged in the course of at least one communication between a first user terminal and a second user terminal via a network comprising a first subnetwork and at least one second subnetwork said first subnetwork being involved in the said at least one communication and not including the first and the second user terminals, the method being implemented by a first network equipment of the first subnetwork, the method comprising:

obtaining by means of a user interface of the first network equipment, at least one piece of time information indicating at least one time interval and at least one terminal identifier for said at least one communication;

transmitting a request to at least one second network equipment of the at least one second subnetwork, said request comprising the at least one piece of time information and the at least one terminal identifier;

receiving from at least one second network equipment of the at least one second subnetwork, at least one response to said request, said response comprising at least one dated dataset relating to at least one data packet exchanged in the course of the communication, said at least one dated dataset being selected from among a plurality of datasets related to data packets that have traveled through the second subnetwork by one of the second network equipments of the second subnetwork, wherein the selecting is according to said at least one piece of time information and said at least one terminal identifier.

2. The obtaining method as claimed in claim 1, in which the request is transmitted to said second network equipment of said at least one second subnetwork via a second communication network.

3. The obtaining method as claimed in claim 1, further comprising obtaining at least one second dated dataset relating to at least one second data packet, said at least one second dated dataset being selected by the first network equipment of the first subnetwork from among a plurality of second dated datasets relating to second data packets received by at least one entity of the first subnetwork, according to the at least one piece of time information and the at least one terminal identifier and a step of classifying the at least one second dated dataset and the at least one dated dataset according to a date associated with each dated dataset.

4. The obtaining method as claimed in claim 3, in which at least one date of at least one set is modified according to a piece of predetermined offset information.

5. The method as claimed in claim 4, in which determining said piece of offset information includes a transmission to an entity of a said subnetwork, of a given signal and a reception of said signal from said entity.

6. The obtaining method as claimed in claim 5, in which during the transmission and reception of said signal, said given signal passes through at least one intermediate subnetwork.

7. A first network equipment of a first subnetwork of a communication network, wherein the first network equipment comprises:

a non-transitory computer-readable medium storing:
a module for obtaining by means of a user interface of the first network equipment, at least one piece of time information indicating at least one time interval and at least one terminal identifier for said at least one communication;
a module for transmitting a request to at least one second network equipment of at least one second subnetwork, said request comprising the at least one piece of time information and the at least one terminal identifier;
a module for receiving from the at least one second network equipment of the at least one second subnetwork, at least one response to said request, said first subnetwork being involved in the said transmitting the request and the receiving the at least one response to said request and not including the first network equipment and the second network equipment, said response comprising at least one dated dataset relating to at least one data packet exchanged in the course of the communication, said at least one dated dataset being selected from among a plurality of datasets related to data packets that have traveled through the second subnetwork, by one of the second network equipments of the second subnetwork, wherein the selecting is according to said at least one piece of time information and said at least one terminal identifier.

8. A non-transitory computer-readable medium storing a computer program product including instructions for implementing steps of an obtaining method for obtaining data relating to data packets exchanged in the course of at least one communication between a first user terminal and a second user terminal via a network comprising a first subnetwork and at least one second subnetwork, said first subnetwork being involved in the said at least one communication and not including the first and the second user terminals, the obtaining method comprising:

obtaining by means of a user interface of the first network equipment, at least one piece of time information indicating at least one time interval and at least one terminal identifier for said at least one communication;

transmitting a request to at least one second network equipment of the at least one second subnetwork, said request comprising the at least one piece of time information and the at least one terminal identifier;

receiving from the at least one second network equipment of said at least one second subnetwork, at least one response to said request, said response comprising at least one dated dataset relating to at least one data packet exchanged in the course of the communication, said at least one dated dataset being selected from among a plurality of datasets related to data packets that have traveled through said at least one second subnetwork, by one of the network equipments of said at least one second subnetwork, wherein the selecting is according to said at least one piece of time information and said at least one terminal identifier.

* * * * *